United States Patent [19]

Reynolds

[11] 3,894,570
[45] July 15, 1975

[54] SELF-TAPPING FASTENER

[75] Inventor: Richard L. Reynolds, Palos Verdes, Calif.

[73] Assignee: Dumont Aviation Associates, Lakewood, Calif.

[22] Filed: Apr. 23, 1973

[21] Appl. No.: 353,449

[52] U.S. Cl. .................. 151/22; 10/10 R; 72/88; 85/1 C; 85/46; 118/621
[51] Int. Cl. ... F16b 25/00; F16b 33/06; F16b 39/30
[58] Field of Search ............... 151/22, 14 R, 14.5; 85/1 C, 10 F, 46, 47, 41; 10/10 R, 27, 152 T; 408/230

[56] References Cited
UNITED STATES PATENTS

| | | | |
|---|---|---|---|
| 3,426,642 | 2/1969 | Phipard | 151/22 X |
| 3,517,717 | 6/1970 | Orlomoski | 151/22 |
| 3,530,920 | 9/1970 | Podell | 151/22 |
| 3,552,467 | 1/1971 | Bergere | 151/14 R |
| 3,643,722 | 2/1972 | Oestereicher | 151/22 |

Primary Examiner—Ramon S. Britts
Attorney, Agent, or Firm—Alan C. Rose; Thomas A. Turner, Jr.

[57] ABSTRACT

A threaded fastener of the self-tapping type is described having the conventional head, shank, and pilot end. The shank includes a helically wound thread member impregnated with a carbide or other, harder substance than the metal from which the fastener is made. A thread-cutting fastener, having its pilot tip end impregnated is also described. A thread-rolling machine with a unique impregnating electrode is disclosed. The electrode is shown to engage the fastener selectively during the thread-rolling operation itself. A method of manufacturing or forming the threaded fastener is described whereby a tough, ductile fastener is shown having superior reciprocal or mating thread forming and cutting characteristics.

12 Claims, 8 Drawing Figures

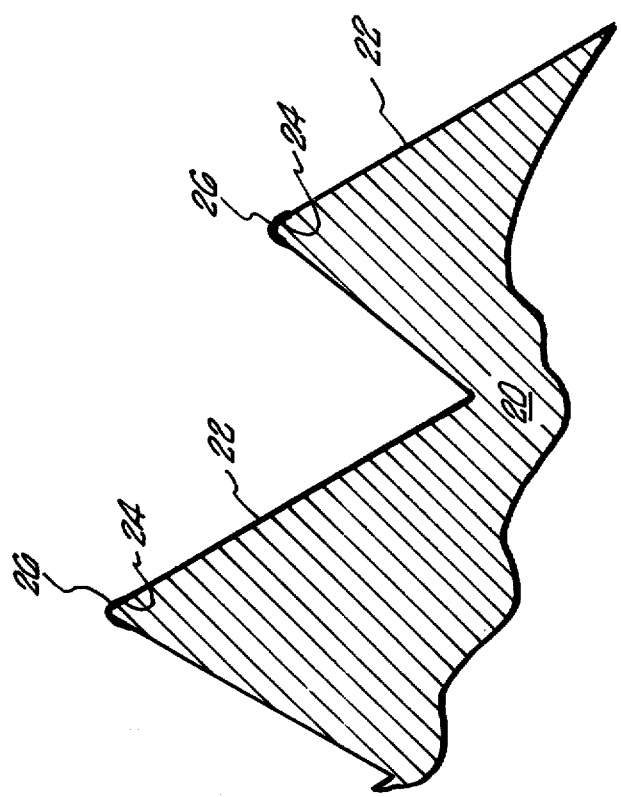
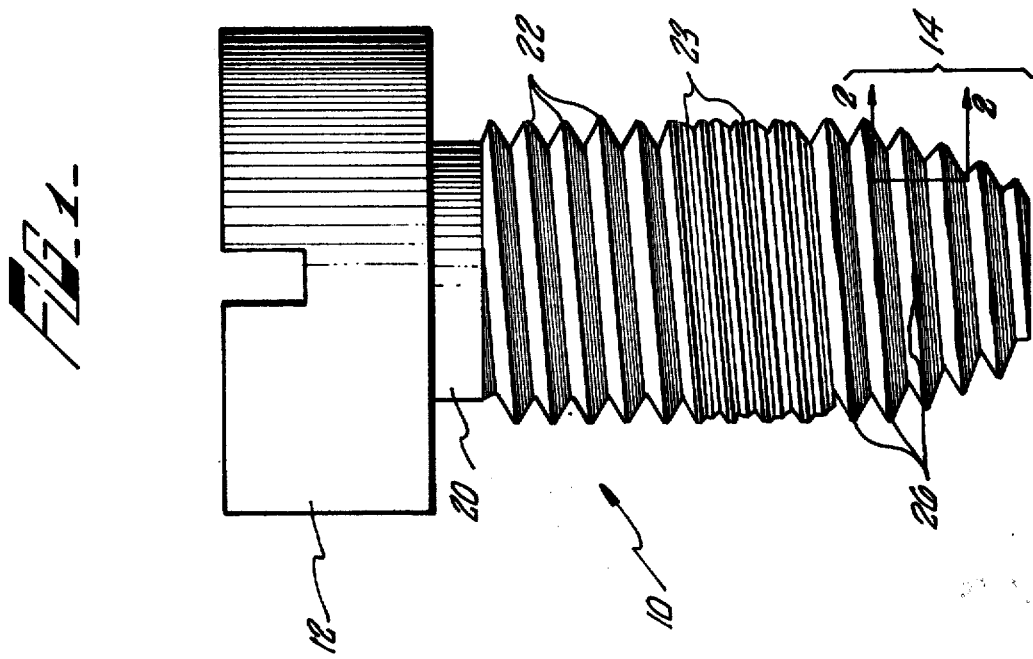

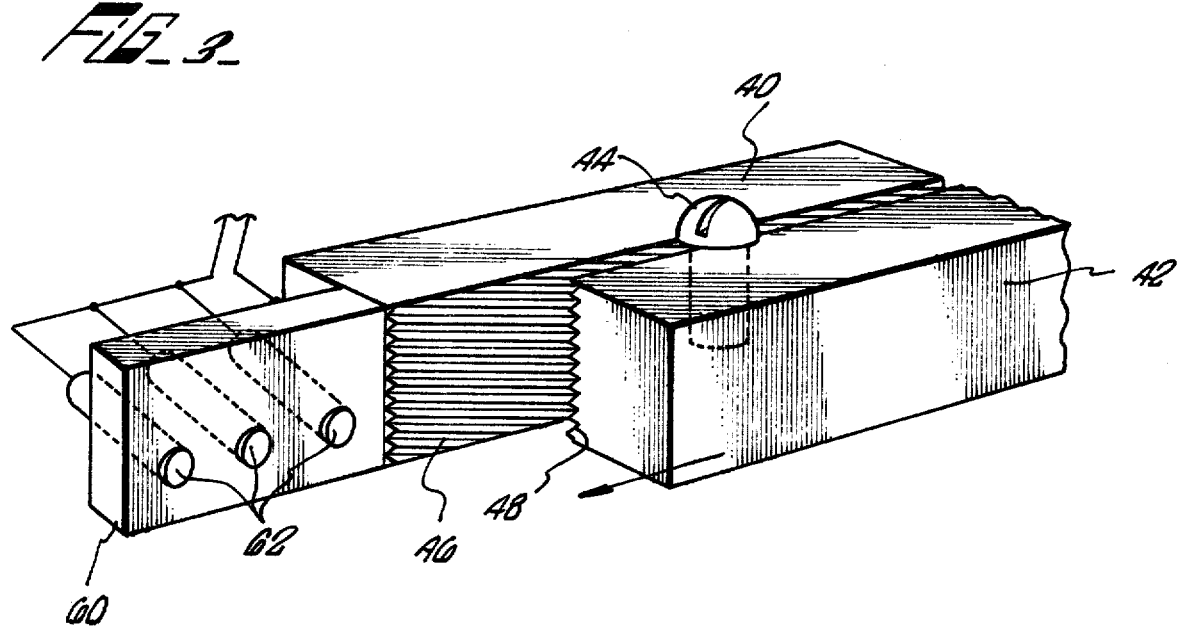
FIG_3_
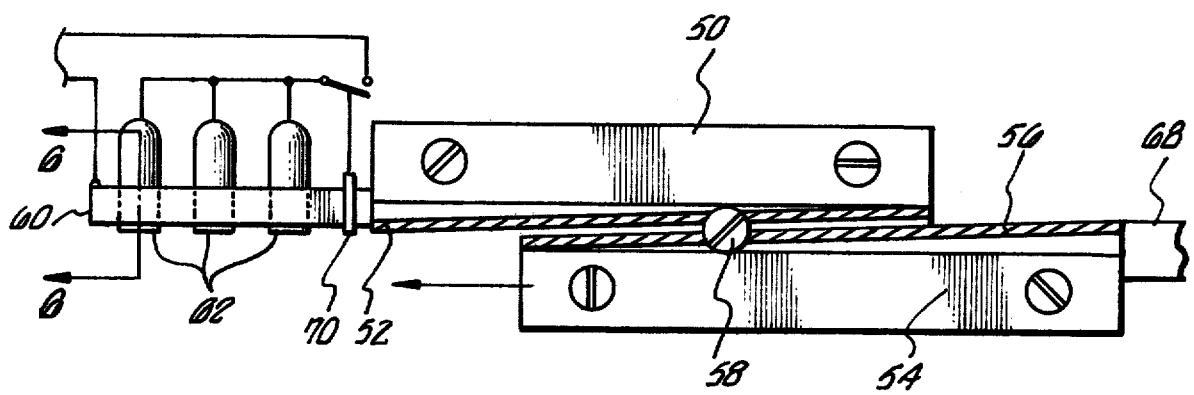
FIG_4_
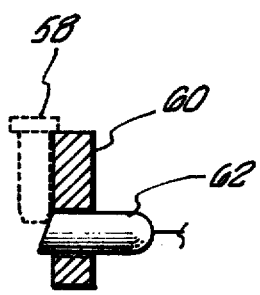
FIG_6_

3,894,570

SELF-TAPPING FASTENER

BACKGROUND OF THE INVENTION

The fastener manufacturing industry has had the problem of making metal fasteners possessing at once characteristics of ductility and toughness, yet having relative thread hardness.

By being ductile or tough, a metal is considered herein as being pliant yet strong, as having the quality of bending or twisting without tearing or breaking. Antonymously, "hardness" is used herein to characterize increasing susceptibility to breaking, or brittleness, in addition to resistance to penetration. In the art or trade, it is customary to use the "Rockwell" hardness testing devices. Using such devices, a metal is penetrated by a substance of known hardness, such as a diamond, with a predetermined force. The depth of penetration gives a relative indication of hardness. A number is assigned directly relative to the penetration depth. The results of such a device are ordinarily given on the Rockwell scales designated A, B and C. The higher the number assigned as a result of such a test, the harder the metal. Thus, a metal having a hardness corresponding to a reading of $C = 30$ or less on the Rockwell scale would be of the order as is normally considered ductile and is used in the manufacture of relatively tough, ductile fasteners.

A fastener made from such tough, ductile material generally fails as a self-tapping screw. A self-tapping screw is one which forms its own mating threads or reciprocal grooves in a drilled hole in metal or in a hole into which the fastener is being inserted. Failure occurs when the ductile or tough thread on the fastener collapses within the unthreaded hole.

Various methods are presently used to make the fastener harder on its outside surface while maintaining toughness. The most common, presently used process is a three-step process. First, the fastener is heat treated to approximately 1,700°F or more. The fastener is then in a second step case hardened. In this second step, the fastener's surface is thoroughly cleaned, heated to approximately 1,250° F to 1,300° F and placed into a carbon rich atmosphere. In such an environment, the metal has a propensity to attract the carbon. The usual result is an approximately 0.004 inch to 0.006 inch carbon layer deposited upon the fastener's surface. The third procedural step is entitled induction heat treating. In this step, the pilot end of the threaded fastener is placed in a rapidly changing inductance field. The iron in the metal has its magnetic field changed by each hysteresis cycle, and thus is heated very rapidly to red hot temperatures. Upon cooling, the molecular structure at least of approximately 0.06 inch of the exposed surface of the pilot end is changed. The result of such treatments, unfortunately, hardens the fastener and makes it more brittle. In fact, such an induction heating procedure has made test fasteners possess a hardness on the order of $C = 45$ and higher on the aforementioned Rockwell scale.

To manufacture these relatively hard fasteners in the currently known manner, a premium alloy steel containing an additional metal alloy ingredient is required. Such additional metal could be manganese, chromium, nickel and the like except carbon. These alloys are expensive. Furthermore, the three-step procedure outlined above requires careful attention and handling. Prior to case hardening, for example, the fasteners and the thread root area between the threads must be thoroughly cleaned of the lubricating oils and other grit of manufacture so that the carbon will evenly and finely deposit upon the surface of the fastener. The carbon rich atmosphere must be precise and requires careful attention.

Additionally, the induction-heating step requires meticulous positioning of the fasteners, lest the entire fastener be so treated. Moreover, the equipment for the induction-heating step is complex and very costly.

The result of all of this trouble and expense is a fastener which has substantially lost the desired ductility and toughness, and in some instances has not achieved the desired hardness. For example, a fastener having a Rockwell $C = 45$ measure of hardness would be too hard and brittle in certain applications where predictable shocks require the fastener to have a certain resilience, ductility and toughness. Yet, the threads of such a fastener even after case hardening and induction treating have collapsed when attempts were made to tap a hole.

A threaded screw fastener made of comparatively tough, resilient material possessing threads having stronger, hard characteristics has been long sought but heretofore unavailable.

SUMMARY OF THE INVENTION

This invention relates to comparatively small metal fastening parts, such as threaded screw fasteners. In practice, these fasteners are made of comparatively tough, ductile material, and are characterized by a comparatively hard substance impregnated at selected points of wear on the thread crests. The threads may be impregnated advantageously during the thread-rolling process wherein the threads are rolled on the cylindrical blanks. This impregnated thread structure is particularly useful in the case of self-tapping fasteners having surface locking arrangements and for high strength fasteners, normally formed of materials which are adversely affected by conventional hardening methods.

One aspect of the invention involves the electrode impregnation of the screw threads or other metal parts as part of the machining process. Unlike other coating processes which require a high degree of cleanliness, the carbide impregnation coating process can tolerate coolant and lubricating fluid and machining grit and thus can be incorporated into manufacturing metalworking processes with little extra expense.

BRIEF DESCRIPTION OF THE DRAWINGS

FIG. 1 illustrates a side elevational view of an alternative embodiment of the invention, showing a threaded screw fastener;

FIG. 2 illustrates a cross-sectional view taken along line 2—2 of FIG. 1;

FIG. 3 illustrates a perspective view of a thread-roll machine application of the invention;

FIG. 4 illustrates a plan view of an alternative thread-roll machine application of the invention;

FIG. 5 illustrates a side elevational view of an alternative embodiment of the invention in use;

DESCRIPTION OF THE PREFERRED EMBODIMENT

Figure 7:
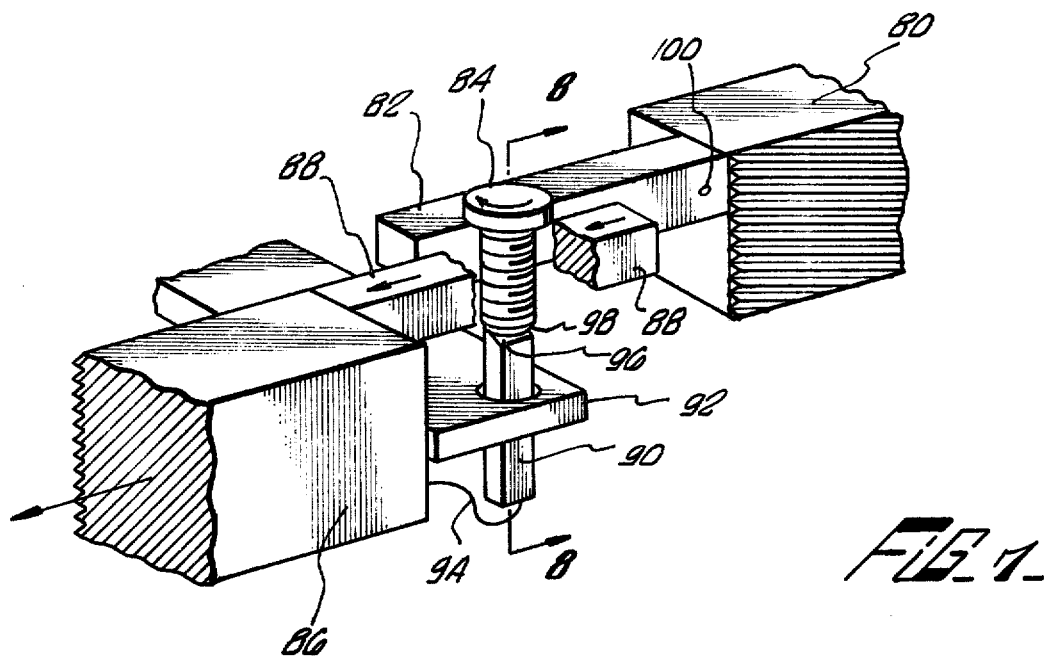
FIG. 7 is a fragmentary perspective view of yet another alternative embodiment of the invention.

To satisfy these aforementioned seemingly contradictory needs in a single fastener, a new fastener construction is shown, reference being had to FIG. 1 in the drawings. As a representative example of possible applications, a screw-type fastener 10 having a head or driving means 12 and conventional pilot end 14, described in more detail below, is shown. The fastener 10 has a shank 20 with a helical screw thread 22 wound thereabout. The shank 20, head 12, pilot end 14 and substantially the thread 22 are made from a relatively ductile, possibly resilient material which is ductile and tough enough to stand up to the stresses under which the fastener could be foreseeably placed. The pilot end 14 of thread 22 is shown in enlarged cross section and more detail in FIG. 2.

The thread 22 has impregnated on its outside edge or crest 24 a small layer 26 of metal, or other relatively hard-type substance such as, for example, tungsten carbide or titanium carbide. Such substances are to be substantially harder than the ductile material used in making the shank 20 and other parts of the fastener 10. A preferred construction is to impregnate only the crest 24 of the initial turns of the thread 22, or pilot end 14 of the fastener 10. When the fastener 10 is introduced to the non-threaded or poorly grooved nut or hole, the hardened crest 24 at the pilot end 14 will form a correctly spaced reciprocal groove or thread therein. The following non-treated shank portion of the thread 22 will then fit within the grooved reciprocal mating thread of the nut formed by the "self-tapping" pilot end 14 so treated. No undue vertical stress will be placed on the base or root of the thread 22 where it joins the shank 20 in such a construction.

By the term "self-tapping," a fastener pilot end both of the thread-forming and of the thread-cutting types is meant. A thread-forming fastener, as the name implies, deforms or reforms the material into which it is driven, forcing the material to conform to the threads of the fastener. In general, the hole for thread-forming fasteners should be sized to produce approximately 80% thread engagement. This value can vary, however, with the flexibility of the materials used. Thread-cutting fasteners, on the other hand are manufactured to function as a tap to cut threads into the material being joined. Usually, as the thread-cutting fastener cuts into the material, chips are generated and pushed ahead of the fastener. See, for example, "Solutions to Plastic Fastening Problems" in *Assembly Engineering*, September, 1971.

Such an impregnated construction is especially useful when employed in combination with the recently developed self-locking, ribbed screw thread 23 developed by Roger W. Orlomoski and adequately described in U.S. Pat. No. 3,517,717 and in co-pending Pat. application Ser. No. 284,006 filed Aug. 28, 1972. The thread in such a screw, designated as an ORLO thread or fastener in the trade, is constructed having a rib or split, dual, resiliently tough crests, one of which protrudes outside the boundary of a normal thread cross section. A cross-sectional view of this ORLO-type thread crest is shown in the referenced patent and application. The two crests of such an ORLO thread 23 are pressed together when inserted into a conventional reciprocal, mating thread groove in a nut or hole. A very superior grip is maintained by the outward resilient tension exerted by the dual crested ORLO thread 23. Naturally, it can be seen that a relatively ductile, tough and non-brittle substance is required for the success of such a fastener. Moreover, a precise, correctly formed mating thread in the nut or hole is greatly desired. Otherwise, the multi-crested thread will likely collapse within the non-tapped nut.

A fastener having its thread 22 impregnated at the pilot end 14 of the shank 20 as described herein will self-tap a nut or hole in such a case. The ORLO thread 23 portion formed beyond the pilot end 14 and beyond the impregnated crest portion will fit within the thus self-tapped nut or hole grooves and provide the desired fastening.

Self-drilling fasteners, not shown, frequently have their pilot ends notched or grooved in the longitudinal, or if the fastener shank is upright, vertical direction. The vertical groove presents a vertical edge in a hole which, when the fastener is forcefully rotated, forms or cuts the hole and mating threads therein. Such vertical grooves, in the past, necessarily had to be of material harder than the hole which was being formed or cut. It has been found, however, that impregnation of this groove's edges provides sufficient hardness to the cutting edges to form or cut the hole itself and the mating threads in the hole. Such a satisfactory hole is cut despite the fact that the main body of the fastener is made of a tough, ductile material which may even be softer than the material of the hole being cut.

Other resilient surface locking arrangements have also been proposed in the fastener industry. For example, one such arrangement involves the regular displacement of a portion of the entire peak of each of several thread sections of a fastener. The impregnation of hardening material on these variations avoids the need for surface hardening by heat treatment or case hardening, and the resultant degradation and embrittlement of any of the types of locking structures used on self-tapping screws.

It has been found that the resultant fasteners possess a hardness at the impregnated crest 22 comparable to a metal having a hardness $C = 70$, or more, on the above-described Rockwell scale. A fastener having its thread so impregnated, it has been found, does not require case hardening nor induction heat treating to possess the required self-tapping capability. Elimination of these steps allows the use of substantially cheaper metal in making the fastener. By eliminating the case-hardening and induction steps, further, the desired ductility of the fastener is kept. The result is a fastener made from substantially less expensive material having a ductility of approximately $C = 30$, or less, while having self-tapping pilot end threads with a hardness of approximately $C = 70$, or more.

Experiments in impregnating aluminum fasteners indicate that such an impregnation will allow, for the first time, aluminum and other non-ferrous metals and low-carbon steels to be used as self-tapping, cutting-type fasteners.

The method of making such a fastener is substantially less difficult and complex than is the method of preparing the case-hardened and induction-treated fasteners in the presently known methods. The carbide can be deposited upon the fastener's thread crests in any of currently known methods. It is preferred, however, that the presently known electric arc vibrating deposition procedures be used. This procedure is described adequately and in detail in U.S. Pat. No. 3,524,956 to I. J. Rocklin. Such an apparatus can be positioned at the end of the thread-roll forming step in a thread-roll machine as will be described in more detail below. A thoroughly cleaned thread is not required for the carbide impregnation. Thus, there is no need to remove the lubricating oil used for the thread rolling, nor to remove the grit of manufacture found in the thread-rolling process. The high voltage and impact force of the electrode during operation are sufficient to impregnate the blank through the oils and grit.

The temperature of the fastener remains substantially the same, and therefore the ductility is not changed. The fastener may then be heat treated for neutral hardness, increasing the strength, such a heat treatment up to approximately 1,850°F will not affect the carbide impregnation. See *Tungsten*, 3rd Ed. (1955) by Li and Wang (American Chemical Society Monograph No. 94), at page 390. It has been found that in the electric arc impregnation, some of the thread crest is removed, but that the deposited carbide substantially compensates therefor. It has been found that the carbide so impregnated anchors into the thread crest or other parts of the fastener approximately 0.001 inch, and forms an additional build-up of approximately from 0.001 inch to 0.0015 inch. The impregnation is solidly implanted upon and into the fastener, and is highly resistant to impact and breaking, it has been found.

It is not necessary to deposit the carbide smoothly or evenly upon the thread crest. Indeed, it is preferred that the impregnation be uneven, resulting in a sawtooth-type configuration upon the crest 24. Such an irregular application is representatively shown in FIGS. 1 and 2 where the impregnated substance 26 of one thread is shown to be somewhat thicker than of the other thread. If the fastener is contemplated as a permanent, once-inserted arrangement, it should be necessary only to impregnate a selected number of points or zones on the initial, pilot end turns of the thread.

It can be seen that such a treated fastener provides a harder and sharper thread crest for functional forming and cutting, yet is not brittle and consequently not susceptible to chipping in shipping and use.

It is contemplated that the impregnation of the carbide or similar substance can be made upon the crest of the fastener thread during the thread-roll step in conventional thread manufacturing machines. In FIG. 3 is shown die block 40 and die block 42, elements in a conventional thread-forming apparatus. Die block 40 is shown as the stationary die. Die block 42 moves in the direction of the arrow. In the conventional and well-known method of manufacturing threaded fasteners, the blank fastener 44 is rolled between the dies 40, 42 as the die 42 is forcefully moved in the direction of the arrow. Threads are formed on the fastener 44 by the work of the reciprocal, mating grooves 46 on the respective working surfaces of the die blocks 40, 42. The facing grooves 46 on these working faces are so matched that when a fastener blank is rolled between the two dies 40, 42, a continuous thread, or a set of parallel continuous threads are formed on the shank of the fastener.

A slightly different thread-roll arrangement is illustrated in FIG. 4. A stationary die block 50 is shown having grooves 52 on its working face. A reciprocal, moving die block 54 is movably positioned with its working face opposite that of die block 50. Die 54 has grooves 56 so that when a fastener blank 58 is rolled between the dies 50, 54 in the direction of the arrow as shown, a continuous thread, or a set of parallel continuous threads are formed on the blank 58.

The dies 50, 54 differ from the dies 40, 42 in that the dies of FIG. 4 have grooved ridges 52, 56 which meet each other in such a way as to form a threaded point or a pilot end of the fastener 58, in accordance with known techniques. The thread-rolling apparatus illustrated in FIG. 3 does not form such a pilot end.

A pilot end in a threaded fastener generally denotes the end of the screw shank opposite the head, or driving end. This end normally has a gradually increasing outside thread diameter beginning from the shank's end. The inside, or root diameter of the thread may or may not be tapered in correspondence with the thread's outside diameter in order to have a useful pilot end. The tapering may not have a thread at all in a pilot end, although normally the thread will extend over such tapering. The fastener of FIG. 3, for example, does not have a pilot end.

With a modification of these thread-rolling dies, the carbide or metal can be automatically and effectively impregnated upon the fastener's threads. In each of the apparatus illustrated in FIGS. 3 and 4, an extension 60 of the stationary die block 50, 40 is shown. This extension 60 has an electrode of the type described in U.S. Pat. No. 3,524,956. Such an electrode 62 deposits or impregnates approximately 0.001 inch of tungsten carbide or other similar material into a metal surface, and leaves approximately a 0.001 inch layer of the carbide protruding from the surface in addition.

The extension 60, as well as any non-forming extension as will be described below, should be constructed so as not to damage or deform the newly formed threads of the fastener blank.

A plurality of electrodes 62 may be placed in the extension 60, as is illustrated in FIGS. 3 and 4 in the drawings. As explained in the referenced patent, the electrodes 62 rapidly move into and out of contact with the newly formed thread crests. The electrodes 62 can be strategically positioned so that only the pilot end 14 is impregnated if that is desired. Alternatively, the electrodes 62 can be positioned so that the entire vertical height of the thread along the shank will be impregnated. Also, one continuous electrode 64 could be positioned as illustrated in FIG. 5. The continuous electrode 64 would effectively impregnate the entire circumference of the fastener's thread crest during thread roll.

This new thread-roll apparatus could be constructed wherein the moving die 42, 54 could actuate the electrodes 62 at a predetermined moment when the fastener blank 44, 58 reaches the extension 60. A pressure switch 70, as shown in FIG. 4, a lever, a radiation sensor or any other well-known electric circuit actuating device could be positioned to cause the electrodes 62 to activate at the desired moment and for the desired time period.

It has been found that impregnating the pilot or tapping end of the fastener approximately every 120° provides suitable self-tapping capabilities. Thus, three electrodes are shown in FIGS. 3 and 4. These electrodes 62 are carefully positioned so that the fasteners 44, 58 will be rolled past them at the precise distance along the circumference of the fastener on which it is desired to have the intermittent impregnation. By way of illustration, the distance between the electrodes 62 in FIG. 3 will be exactly 120° of the circumference of the outside diameter of the threads on fastener 44.

The electrodes 62 may be energized by the moving die 42, 54 so that they will operate only when the fastener 44, 58 approaches the extension 60, and the grooves 48, 56 of the reciprocal moving die have moved beyond them. There will, of course, have to be added to the moving die 42, 54 an extension 68 shown here only in FIG. 4. Such an extension 68 will not have grooved ridges and will serve only to continue rolling the fastener past the electrodes 62, 64 after the conventional thread-rolling step has been completed.

Figure 6:
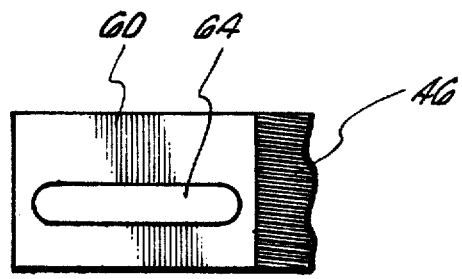
FIG. 6 is a cross-sectional view taken along line 6—6 of FIG. 4.

If a pilot end is made on the fastener, such as fastener 58 shown in phantom in FIG. 6, the electrodes 62 should have a canted electrode tip. Such a canted electrode tip should fit complementally against the taper of the diminishing outside diameter of the thread on the pilot end of the fastener 58. Such a complementally canted fit is illustrated in FIG. 6. This type of specially formed electrode tip also has particular advantages when used to impregnate the hole-forming edges of a vertically grooved, self-tapping fastener. The hole-forming edge is thus completely impregnated along its vertical length.

Figure 8:
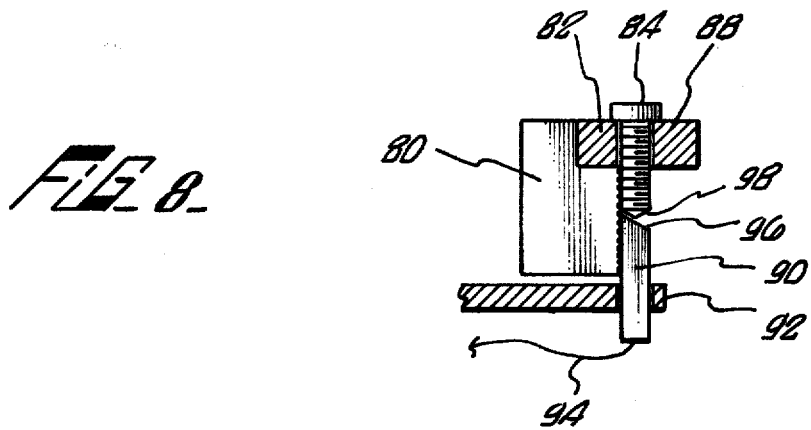
FIG. 8 is a side elevational view taken along line 8—8 of FIG. 7.

If a self-tapping, cutting type pilot end is desired, it may prove to be advantageous to impregnate the self-tapping, cutting type tip end of the shank from the lower end of the thread-rolling apparatus as opposed to impregnation from the sides as shown in FIGS. 3 and 4. In FIGS. 7 and 8, for example, a basic scheme for impregnating a thread fastener on its tip end from the bottom is shown. A stationary thread-roll die 80 is shown having an extension 82. The extension 82 is adapted to extend only so far down from the neck of the fastener 84 so as to retain the fastener 84 in its travel for a short distance beyond the ordinary, normal thread-roll dies.

A die 86 movable in relation to die 80 is shown having an extension 88 comparable in shape and purpose to extension 82. The die 86 and extension 88 move in the direction of the arrows shown in FIG. 7 when the fastener 84 is being thread-rolled and the threads thereon are being formed.

An impregnating electrode 90 of the description given above is positioned vertically by suitable support means 92. The electrode 90 is electrically connected to the power source, not shown, by connection 94.

Electrode 90 is shown having a slanted tip 96 for engaging a self-tapping, cutting type tip end 98 of a formed fastener 84. Thus, the cutting edges or crests of the tip end 98 of fastener 84 can be impregnated with a hard substance, such as tungsten carbide or titanium carbide during the thread-roll forming process economically, efficiently and at very high speed. When the fastener 84 is rolled in the direction of the arrows in FIG. 7, the extensions 82, 88 cause the fastener 84 to continue being rolled (but not formed) for a short distance beyond the ordinary thread-roll dies 80, 86. A self-tapping tip end 98 of the fastener 84 will then be brought into close proximity to the slanted tip 96 of impregnating electrode 90. The electrode 90 may be actuated by actuating device 100, and be caused to come into rapid and repeated impregnating contact with tip end 98. Actuating device 100 may be a switch or a sensor electrically connected to connection 94 so as to actuate electrode 90 for selected, predetermined periods sufficient to ensure that electrode 90 will be operating when the fastener 84 is rolled in proximity over the electrode 90.

If the tip end 98 of the fastener 84 is horizontally level, the tip 96 of electrode 90 should complementally be horizontally level. Moreover, it should be pointed out that vertical electrodes, as shown in FIGS. 7 and 8, and horizontal or angled electrode, as shown in FIGS. 3, 4, 5 and 6, may be combined in the same thread-roll machine so that the threads and the tip end of the fastener are impregnated as described. Such dual impregnation could be arranged to occur simultaneously or seriatim, however the fastener manufacturer may desire.

Such impregnated self-tapping, cutting type, or self-drilling fastener tip ends 98 are extremely practical when the fastener 84 is made of aluminum or other non-ferrous alloys. The carbide impregnation on the cutting edges of the self-tapping or self-drilling tip end of such alloys, as well as to the tapping threads, allow an aluminum or other non-ferrous metal alloy screw to be used for light gauge steel and aluminum sheets.

Reviewing the present invention, it may be noted that a new technique for economically producing high strength fasteners has been developed. The fasteners may be made of tough, inexpensive low carbon steels or of non-ferrous metals, and are not subject to the embrittlement or other adverse effects of conventional heat treatments for surface hardening. The hardening impregnation may be placed on two, three or more zones on the lead threads of the self-tapping screws, thus providing self-tapping capabilities without impairing the basic toughness of the body of the fastener, or the resiliency or yield point of resilient locking features of the threads of fasteners.

I claim:
1. A self-tapping threaded fastener comprising:
   a. a shank including driving means at a first end thereof, and self-tapping means at a second end thereof, said shank being formed of a relatively ductile material;
   b. said shank including at least one helically wound thread each having a plurality of helical turns formed about said shank for at least a portion of the length of said shank, said self-tapping means including a continuation of said threads, each said thread including at least one crest; and
   c. a substance substantially harder than said relatively ductile material, deposited on and into selected portions of at least said thread crest which defines at least a portion of said self-tapping means, said selected portions located along substantially at least one full helical turn length said substance impregnating the material of said fastener.

2. A fastener as claimed in claim 1 wherein said self-tapping means includes cutting edges comprising said impregnating substance.

3. A fastener as claimed in claim 1 wherein said impregnating substance is taken from the group consisting of titanium carbide and tungsten carbide.

4. A fastener as claimed in claim 1 wherein said impregnating substance is impregnated intermittently along the length of said crest beginning at said second end of said fastener for at least three helical turns of said thread.

5. A fastener as claimed in claim 1 wherein said impregnating substance is impregnated on said crest continuously beginning at said second end for at least three helical turns of said thread.

6. A fastener as claimed in claim 1 wherein said impregnating substance is impregnated on said crest at a maximum outside diameter of said thread.

7. A fastener as claimed in claim 1 wherein at least a portion of said thread not at said second end comprises deformable locking means.

8. A fastener as claimed in claim 7 wherein said locking means are resilient.

9. A fastener as claimed in claim 8 wherein said resilient locking means further comprises dual crests on said at least one thread.

10. A fastener as defined in claim 1 wherein the body of said fastener is made of a relatively tough, soft material.

11. A fastener as defined in claim 10 wherein the body of said fastener is made of low carbon steel.

12. A fastener as defined in claim 10 wherein the body of said fastener is made of nonferrous metal alloys.

* * * * *